US005338206A

United States Patent [19]

Hupfer

[11] Patent Number: 5,338,206

[45] Date of Patent: Aug. 16, 1994

[54] APPARATUS AND METHOD FOR TESTING EFFECTS OF A MOTOR VEHICLE ACCIDENT

[75] Inventor: Peter Hupfer, Munich, Fed. Rep. of Germany

[73] Assignee: Technischer Uberwachungsverein Bayern e.V., Munich, Fed. Rep. of Germany

[21] Appl. No.: 26,623

[22] Filed: Feb. 26, 1993

Related U.S. Application Data

[63] Continuation of Ser. No. 661,155, Feb. 27, 1991, abandoned.

[30] Foreign Application Priority Data

Mar. 1, 1990 [DE] Fed. Rep. of Germany ....... 4006433

[51] Int. Cl.[5] ............................................. G09B 19/14

[52] U.S. Cl. ..................................... 434/305; 434/66; 364/460; 340/436; 73/865.3; 318/587

[58] Field of Search ..................... 434/62, 66, 68, 305; 364/460–462, 424.02, 424.04, 424.05; 340/436; 318/587; 367/909; 73/12, 488, 862.381, 865.3, 865.6

[56] References Cited

U.S. PATENT DOCUMENTS

| | | | |
|---|---|---|---|
| 4,530,056 | 7/1985 | MacKinnon et al. | 364/424.02 |
| 4,602,334 | 7/1986 | Salesky | 364/461 X |
| 4,638,289 | 1/1987 | Zottnik | 364/424.02 X |
| 4,790,402 | 12/1988 | Field et al. | 364/424.02 X |
| 4,926,171 | 5/1990 | Kelly | 364/461 X |
| 4,947,094 | 8/1990 | Dyer et al. | 364/424.02 X |
| 4,982,329 | 1/1991 | Tabata et al. | 364/424.02 |
| 4,992,943 | 2/1991 | McCracken | 340/436 X |
| 5,186,695 | 2/1993 | Mangseth et al. | 482/903 X |

OTHER PUBLICATIONS

"Simulating Vehicular Collisions", 961 Mechanical Engineering, 107: (1985) Oct., No. 10, pp. 63–68.

"Integrierte Datenerfassung und -verarbeitung im Fahrzeugsicherheits-versuch", Dr.-Ing. Martin Kramer, Oct. 1979, messen+prufen/automatik, pp. 785–790.

"Forschungen und Entwicklungen am Automobil 1974", K. E. Hailer et al., ATZ Automobiltechnische Zeitschrift, 76. Jahrgang, Nr. 9, Sep. 1974, pp. 277–284.

"Methoden und Einrichtungen fur Unfallversuche", E. Fiala et al., Vortrag auf der VDI/ATG-Tagung Entwicklungsaufgaben am Fahrzeug, 14./15. Nov. 1963 in Wiesbaden, pp. 203–209.

"Die Aufprall-Versuchsanlage der Bundesanstalt fur Strassenwesen" Wolfgang Sievert, 180 ATZ Automobiltechnische Zeitschrift, vol. 82 (1980) Oct., No. 10, pp. 507–511.

*Primary Examiner*—Richard J. Apley
*Assistant Examiner*—Joe H. Cheng
*Attorney, Agent, or Firm*—Finnegan, Henderson, Farabow, Garrett and Dunner

[57] ABSTRACT

A method and apparatus for testing the effects of a motor vehicle accident, by using at least one motor vehicle to reproduce the accident as it actually occurred. To simulate the accident, one or more vehicles are moved in a travel path corresponding to the actual situation, and if required under the influence of environmental conditions at the time, by controlling the speed, steering and braking of the vehicle in accordance with the accident as it actually happened.

26 Claims, 3 Drawing Sheets

CONTROL COMPUTER
CONTROLLER
COMPUTER

LASER
21
22
23
CONTROL COMPUTER
1
18
20
11
7
10
9
9
12
13
14
15
19
16
5
CONTROLLER
6
COMPUTER
9'
9'
16
17
8

APPARATUS AND METHOD FOR TESTING EFFECTS OF A MOTOR VEHICLE ACCIDENT

This application is a continuation of application Ser. No. 07/661,155, filed Feb. 27, 1991, now abandoned.

BACKGROUND OF THE INVENTION

This invention relates to a method and an apparatus for testing the effects of a motor vehicle accident in which at least one motor vehicle is guided to a previously defined point of collision.

In the motor vehicle industry, crash tests are often used to test new vehicles for their crash worthiness. In these tests, the motor vehicles are moved and collided with an obstacle. The obstacle itself can be at rest or it can be a second moving motor vehicle. The accidents simulated here are made to correspond to accidents which particularly endanger the motor vehicle and its occupants, such as, for example, a roll over of the vehicle. They also simulate the most frequent accidents known from accident statistics, such as, for example, rear-end collisions, frontal or lateral collisions and the collision of different vehicles at different angles.

During and after the simulated accident, stress and damage to the vehicles and its simulated occupants are recorded and evaluated for the purpose of improving the active and passive restraint systems for the vehicle's occupants. In some cases, the crash tests also serve as a check of the motor vehicles produced by computer calculation and simulation.

In the crash tests, the motor vehicle can be guided in a controlled fashion, e.g., by remote control of its steering and speed. Simulated vehicle occupants are usually carried in the form of dummies.

German Offenlegungsschrift 3,248,192, describes an apparatus which records the data of a motor vehicle before an accident and, like the flight recorder in aircraft, can be used essentially as a recorder of conditions in an actual accident. Data for the speed, brake actuation, horn, indicators, etc. are recorded and, in the case of an accident, can be used to provide information on, for example, incorrect actuation of an indicator or excessive speed and thus can be used to assess liability. Only the data of the last 200 meters of travel of the vehicle are available, however, because all previously recorded data will have been erased.

A disadvantage here is that with neither method or apparatus is it possible to reproduce an actual accident with respect to the vehicles involved, vehicle speed, direction of travel, etc. In the crash test, an accident is only brought about in order to test the effects on the motor vehicle. The accident does not reproduce one which has actually happened in traffic, but is only ever a simulated version of a typical accident provided by accident statistics.

The accident recorder according to German Offenlegungsschrift 3,248,192 is not suitable for simulating the course of such accidents. It only supplies data on an accident which has already occurred. Also, it is not possible to perform a test on various influencing factors on the accident with this apparatus.

Another disadvantage is that no environmental influences, such as, for example, a wet or slippery roadway or differences in the surface of the roadway during the accident, can be taken into account.

It is therefore an object of the invention to provide a method for testing the effects of a motor vehicle accident of the type mentioned above in such a way that an accident which has actually happened can be reproduced. In addition, it is intended to provide an apparatus which guides one or more motor vehicles in accordance with the course of the accident.

SUMMARY OF THE INVENTION

In the method according to the invention, one or more vehicles are moved in a driving path corresponding to the actual accident situation, and if required under the influence of environmental conditions at the time, by control of the speed and direction of travel of the vehicles in accordance with the accident as it actually happened.

In the method according to the invention, the vehicle's speed and direction of travel are reproduced in the way it is thought they have occurred shortly before the accident on the basis of the testimony of witness to the accident, those involved in the accident or experts. The accident can thus be reproduced not only as regards the motor vehicles and driving variables employed, but also at the scene of the accident, for example, on the actual stretch of road on which the accident took place, taking into account the particular environmental influences possibly prevailing at the time of the accident.

In this way, all of the variables that occurred during the course of the accident can be taken into account and the accident can be reproduced very realistically. By comparing the actual accident with the reproduced accident, it is then possible, for example, to check the statements of those involved as regards the question of liability, even if, for example, certain clues such as skid marks are absent due to the use of anti-lock brake systems (ABS). It is of course, likewise possible, as in crash tests, for dummies to be carried in the motor vehicles in order to test the effects of the accident on vehicle occupants. Alternatives to the course of the accident can also be reproduced, including the last reaction of the driver, such as, for example, applying the brakes or pulling the steering wheel too hard.

Preferably, the vehicle is guided along a guide pilot cable laid on or in the surface of the roadway in accordance with the driving path of the vehicle at the time of the accident. The guide cable can be readily attached to any roadway surface. It can be laid at the scene of the accident in accordance with the paths travelled by the vehicles before the accident and vehicles corresponding to the motor vehicles involved in the accident can be moved towards the scene of the accident along the cable. All motion variables known from the accident are reproduced as the vehicles are moved along the cable and made to collide.

It is an advantage here if the motor vehicle simulating the accident is moved by its own engine. It is also advantageous if the speed of the motor vehicle is determined by an actuator, e.g. by altering the engine speed. In addition, the speed of the vehicle can be altered, by changing the transmission ratio in the case of automatic transmissions or by changing the engine speed in the case of manual transmissions, the approach gear in this case being that in which the accident took place, the motor vehicle being steered by an actuator and decelerated by actuating the vehicle's brakes.

In this way, it is possible to alter all of the driving functions and motion parameters of the motor vehicle by influencing the engine, the transmission, the steering and the brakes. Since the motor vehicle is not influenced directly from outside but is moved by equipment belonging to the vehicle itself, the course of the accident can be reproduced more realistically. Additional equipment, such as external aids to motion, guidance of the vehicle to the scene of the accident along a track or constrained steering are not necessary.

BRIEF DESCRIPTION OF THE DRAWINGS

The invention is explained in greater detail below with reference to illustrative embodiments represented in the drawing, in which.

DETAILED DESCRIPTION OF THE INVENTION

Figure 1:
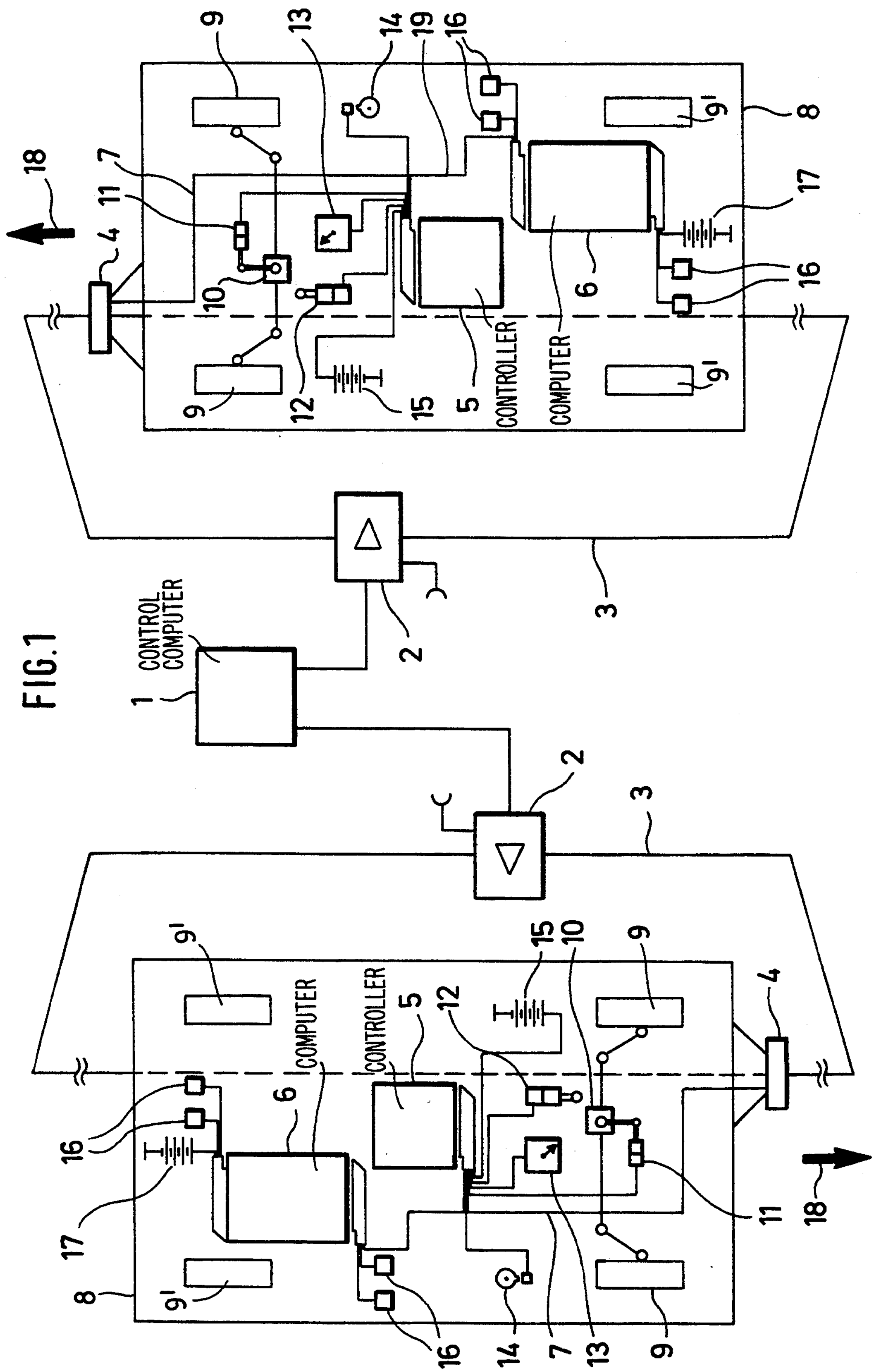
FIG. 1 shows two motor vehicles with pilot cable guidance.

With reference to FIG. 1, the apparatus for carrying out the method of the invention comprises a control means such as control computer 1, which is arranged outside the motor vehicle 8 and preferably is stationary. The control computer 1 controls the various motion parameters of the motor vehicle or vehicles which are involved in the accident to be reproduced. In addition, it serves to monitor the actual values of the motion parameters in each case actually performed by the motor vehicles 8 each having a pair of front wheels 9 and rear wheels 9'. The control computer 1 determines any deviations from the actual values and the necessary corrections which are required for exact compliance with the motion parameters which occurred during the course of the actual accident.

The control computer 1 is connected via data lines to pilot cable transmitters 2. The pilot cable transmitters 2 can here also additionally be designed as receivers. The pilot cable transmitters 2 can be of single-channel or multi-channel design and for the purpose of exchanging data between control computer 1 and an onboard vehicle controller 5. By virtue of a battery backup they are independent of an external power supply. In addition, the pilot cable transmitters 2 also have one or more additional frequency inputs, which can be used, for example, for controlling the vehicle's speed.

Data exchange between control computer 1 and onboard controllers 5 is here effected via pilot cables 3 which are connected to the pilot cable transmitters 2 and can be laid on the surface of the roadway for the purpose of guiding the motor vehicle along the path of travel corresponding to the course of the accident.

The data is received from the transmitters and, depending on the situation, by onboard receiving devices, such as, for example, an antenna 4 on the motor vehicle, which is preferably fitted at the front of the vehicle in the driving direction. From the antenna 4, the data passes via connecting lead 7 to the onboard controller 5. There the data transmitted is used to control the motion parameters of the vehicle, such as, for example, speed, steering or brake actuation.

To control these motion parameters, the onboard controller 5 is connected, in the embodiment illustrated in the drawing, to an actuating cylinder 11 for controlling the steering mechanism 10 of the vehicle's front wheel 9. Thus, control of the direction of travel of the motor vehicle 8 along the pilot cable 3 as well as any final steering maneuvers which might have taken place before the accident, such as, for example, turning the steering wheel hard, can be faithfully reproduced.

Further connections of the onboard controller 5 are provided for controlling actuation of the brakes and the vehicle's speed. A brake intervention device 12 is connected directly to the onboard controller for the purpose of triggering the brakes. By virtue of the brake intervention device 12, it is possible in this arrangement to represent reactions of the driver shortly before the accident, such as, for example, a final application of the brakes or drastic braking. In addition, the brake intervention device 12 is designed with an emergency braking function, so that in the event of a deviation of the motor vehicle from the pilot cable or, for example, in the event of a failure of a technical device, the motor vehicle can be automatically stopped.

The speed of the vehicle is adjusted to predetermined setpoint values by the onboard controller 5 with the aid of a sensor 14, which is designed essentially in the form of a tachometer. The controller is connected to a speed control device 13 which can operate throttle valve or be in the form of a standard cruise controller.

The path of the motor vehicle 8 along the pilot cable 3 is effected essentially automatically from the vehicle, it being possible, for example via antenna 4, to hold the vehicle in relation to the pilot cable 3 inductively or in some other way, its path being corrected, if required, by intervention of the onboard controller 5 actuating the steering cylinder 11. Control of the speed is also effected largely by the motor vehicle alone, i.e., from the onboard controller. With the aid of the speed sensor 14, it is always possible for actual speeds to be determined and adjusted if necessary to the required values with the aid of the onboard controller and speed control device 13.

However, it is advantageous if at least some of the motion parameters are controlled by signals from outside the motor vehicle, the signals being received by the onboard receiver and passed to the onboard controller for the purpose of controlling the necessary parameters. Since the motor vehicle is damaged to a greater or lesser extent in the accident, the costs for such a simulation of accidents can be considerably reduced if no additional expensive monitoring or storage devices are provided in the motor vehicle apart from the sensors and control devices which are necessary. In addition, it is also possible for larger and faster computers to be employed which make possible a brief alteration of the motion parameters, as may prove necessary when observed from outside.

In the case of two or more vehicles designed to be guided to a point of collision from different directions, an exact determination of the relative positions with respect to one another and to the point of collision, including the absolute and relative velocities, is possible with the aid of trigger marks at regular intervals in the pilot cable and the control computer 1. The values are compared with the corresponding required values and, if necessary, the motor vehicles are adjusted to these setpoint values by the intervention of the onboard controller 5 via pilot cable transmitters 2 and pilot cable 3 controlling the steering actuating cylinder 11, speed control device 13 and brake intervention device 12. For this reason, the control computer 1 has priority over the onboard controller 5 and controls the motion parameters via the onboard controller.

This ensures instantaneous knowledge of the relative positions of the motor vehicles with respect to one another and with respect to the point of collision and of a sequence of motions of the motor vehicles corresponding precisely to the actual accident at every moment during the reproduction of the accident. In one advantageous embodiment, pilot cable transmitters 2 transmit these correction values to the onboard controllers 5 via the onboard receivers 4 of the motor vehicles 8 arranged between control computer 1 and pilot cables 3.

To make the devices in the motor vehicle independent, all functions and also the onboard controller 5 are run by a vehicle battery 15 as in a "normal" motor vehicle.

Further sensors 16 can be arranged on the motor vehicle in order to record various measurements during the course of the accident. These sensors 16 are connected to a second onboard computer 6 which is designed to process and store the measurement signals. In addition, a connection to the antenna 4 and to onboard controller 5 is established via a cable 19. The onboard computer 6 thus also has access to the motion parameters which are controlled by the onboard controller 5. Thus the onboard computer 6 including the sensors 16 can, for example, be activatable via antenna 4. The onboard computer 6 may here be equipped with its own power supply 17. The onboard computer 6 is thus not dependent on the vehicle battery 15 and its action is guaranteed for the entire duration of the test. In addition, onboard computer 6, power supply 17 and sensors 16 are arranged in a specially protected fashion in the motor vehicle. The measured values transmitted by the sensors 16 to the onboard computer 6 can be stored and then evaluated later after the accident.

However, it is also possible to transmit the measured values from the onboard computer 6 to storage devices situated outside the motor vehicle, which will not be destroyed by the accident to present loss of the data.

Thus these sensors provide, shortly before and during the accident, a precise insight into motion parameters such as speed and also other measured variables, such as, for example, acceleration or deceleration of dummies representing the vehicle occupants for the purpose of testing possible injuries in the accident.

Depending on the embodiment of the apparatus for simulating motor vehicle accidents, corresponding identical apparatuses are arranged on board the motor vehicles in accordance with the motor vehicles involved in the accident and guided to the collision point. By virtue of the higher-ranking control computer 1, an exact matching of all motion parameters of each motor vehicle both to the setpoint values determined by the course of the accident and also for adjusting them to one another is possible. In addition, the onboard controller can also be designed as an integrated component in the onboard computer.

If something unforeseen, such as, for example, an obstacle in the path of travel as set by the pilot cable or a technical defect, hinders or even prevents the simulation of the accident, it is advantageous if an emergency stop is triggered in the event of failure of a control device or some other technical device, and also in the event of adverse external circumstances. As in the case of an obstacle on the roadway, this can be done by hand or, alternatively, as for example in the case of a technical defect, automatically.

Figure 2:
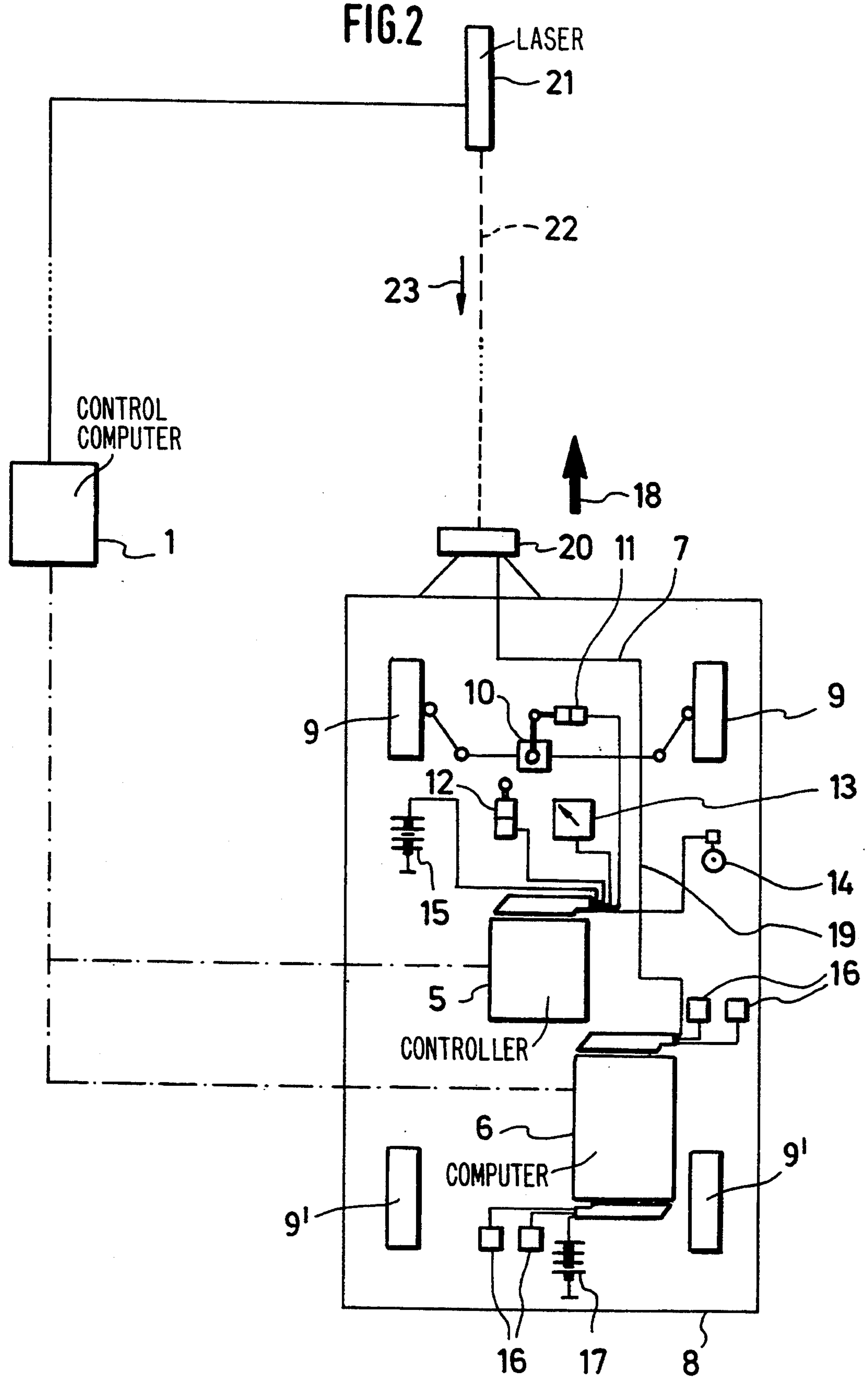
FIG. 2 illustrates a motor vehicle with laser track guidance.

FIG. 2 illustrates another embodiment of the invention. Parts which correspond to those of FIG. 1 have the same reference numerals. In this embodiment a laser-beam receiving means 20 is arranged on the front side of the vehicle 8 instead of the antenna 4 of FIG. 1. This means is connected to the onboard controller 5 and the onboard computer 6. The control inside the vehicle is carried out in a manner similar to that as described with respect to FIG. 1 and will not be described again in connection with FIG. 2.

A laser 21 is arranged at or near the point of collision and guides the motor vehicle 8 to the point of collision with the aid of a laser pilot beam 22 received by the laser-beam receiving means 20. Possible deviations of travel direction 18 and laser pilot beam direction 22 can be corrected by the onboard computer 6 and/or the onboard controller 5 in accordance with the embodiment regarding the antenna and pilot cable, so that both directions correspond to each other.

The control computer 1 is arranged outside the vehicle 8 and in communication with the laser 21 e.g. by a cable, or is in radio communication with the onboard controller 5 arranged in the vehicle 8 and with the onboard computer 6.

Alternatively the laser can be arranged on the vehicle. In this case the laser light is reflected by the obstacle or by another vehicle, possibly with the aid of a mirror, and the reflected laser beam is used to control the driving path.

It is preferable, however, that laser 21 be arranged outside the vehicle and the laser pilot beam 22 be received by laser-beam receiving means 20 on the motor vehicle to prevent damage to the laser during the collision of the vehicles. Deviations of the vehicle directions and the laser pilot beam and possibly the distance of the vehicle to the obstacle can be determined with the aid of the receiving means, and the vehicle can be controlled with regard to the direction and e.g. with regard to the speed.

In this respect it is advantageous if the laeer-beam receiving means consists of a plurality of photocells arranged horizontally. A location-dependent reception of the laser beam can then be obtained and guidance along the driving path by the laser pilot beam facilitated.

It is also of advantage that the onboard controller and/or onboard computer be connected to the laser-beam receiving means. With the aid of the signals transmitted by the laser-beam receiving means, the onboard controller or onboard computer can determine a deviation of the vehicle direction relative to the laser pilot beam and guide the vehicle along the given driving path.

In contrast to the pilot cables laid on or in the surfaxe of the roadway, the use of the laser pilot system does not require any extra work.

In cases where the vehicle loses the laser pilot beam, it is advantageous to trigger an emergency brake function so that an uncontrolled course of the accident is prevented.

Figure 3:
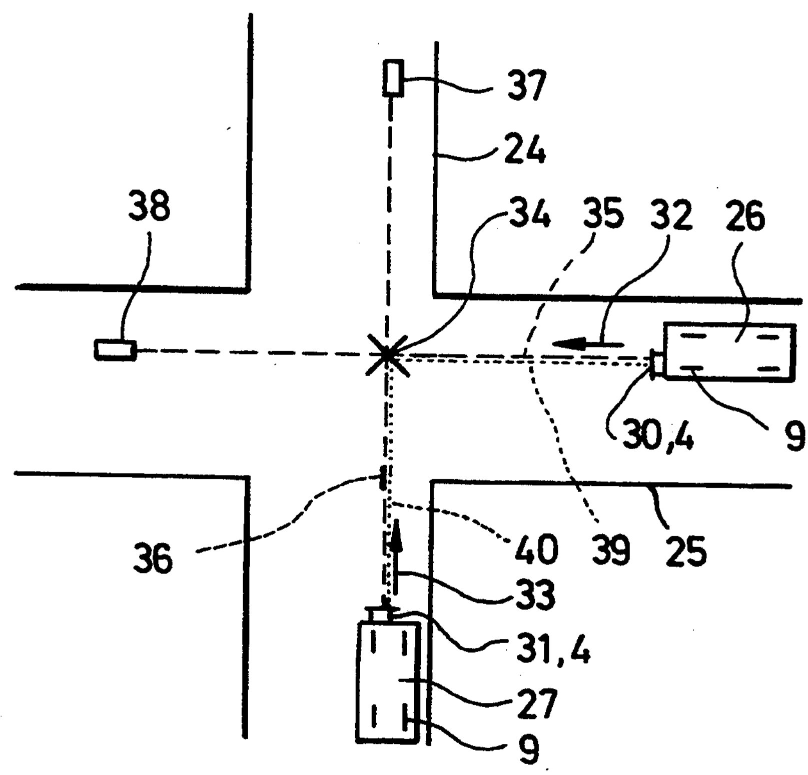
FIG. 3 shows an accident situation with laser track guidance and pilot cable guidance, respectively.

FIG. 3 illustrates a typical accident situation by way of example. The vehicles 26 and 27 travel in the directions 32 and 33 respectively in two intersecting streets 25 and 24. The two vehicles are to collide at a collision point 34. Laser-beam receiving means 30 and 31 respectively are located on the front side of each vehicle 26 and 27. Lasers 38 and 37 are each arranged beyond the point of collision 34 when seen in an extension of the directions 32 and 33 of vehicle 26 and vehicle 27, respectively. These lasers emit laser beams 35 and 36 which impinge on the laser-beam receiving means 30 and 31, respectively. The vehicles 26 and 27 are thus guided by these laser beams to the point of collision 34.

Relative to the embodiment of the invention as illustrated in FIG. 1, pilot cables 39 and 40 instead can be laid on or in the roadway in FIG. 3. The vehicles 26 and 27 are then guided by the pilot cables up to the point of collision 34 with the aid of the antennae 4.

In accordance with the invention, all of the vehicles involved in the accident can each be equipped with a laser beam guide system or a pilot cable guide system or with combinations of both guide systems.

I claim:

1. A method for simulating an accident involving a motor vehicle, comprising:

providing a location corresponding to an approach to and scene of the simulated accident;

generating signals in a control computer corresponding to estimated motion parameters of a motor vehicle approaching the scene of the simulated accident;

mounting to a motor vehicle selected for the simulation, a controller responsive to the received signals from said control computer, for operating a steering mechanism, a braking mechanism, and a speed control mechanism of the selected vehicle;

sensing actual motion parameters of the selected vehicle by a plurality of sensors wherein the actual motion parameters including speed, braking condition, and direction of the selected vehicle are sensed during simulation of the accident;

generating signals corresponding to the sensed actual motion parameters for determining the actual operating parameters of the selected vehicle while approaching the scene of the accident being simulated;

guiding the selected vehicle along a pre-selected path corresponding to the approach to the scene of the accident being simulated in response to signals received by the controller; and operating the controller in response to the signals corresponding to the estimated motion parameters generated by the control computer and the generated signals corresponding to the sensed actual motion parameters of the selected vehicle for varying the operation of the steering mechanism, the braking mechanism and the speed control mechanism of the guided selected vehicle at predetermined locations along the pre-selected path.

2. The method of claim 1, wherein the step of guiding the selected vehicle along said pre-selected path includes guiding the selected vehicle along a pilot cable laid along the pre-selected path.

3. The method of claim 2, wherein the step of guiding the selected vehicle further includes propelling the selected vehicle under its own engine power.

4. The method of claim 3, wherein the step of operating the controller to vary the speed of the selected vehicle includes operating a speed control device to control the speed of the engine.

5. The method of claim 3, wherein the step of operating the controller to vary the speed of the selected vehicle includes controlling the transmission of the vehicle.

6. The method of claim 3, wherein the step of operating the controller to steer the selected vehicle includes operating an actuator that activates the steering mechanism of the vehicle.

7. The method of claim 3, wherein the step of operating the controller to vary the braking of the selected vehicle includes operating an actuator that activates the brake mechanism of the vehicle.

8. The method of claim 2 wherein the step of generating signals in a control computer for operating the controller includes connecting the control computer to the pilot cable, and generating the signals in accordance with the sensed position of the selected vehicle at spaced pre-selected locations along the pilot cable.

9. The method of claim 8 further comprising, recording during a course of travel of the selected vehicle the movements of the speed control, steering, and braking mechanisms by a computer mounted on the selected vehicle for storage and later evaluation.

10. The method of claim 8 further comprising triggering an emergency stop of the selected vehicle in the event of at least one of failure of a device and adverse external circumstances.

11. The method of claim 1, wherein the step of guiding the selected vehicle along said pre-selected path includes a laser pilot beam along the pre-selected path, and receiving the laser beam by receiving means mounted to the selected vehicle.

12. The method of claim 11, wherein the step of guiding the selected vehicle along said pre-selected path further includes determining the position of the selected vehicle relative to the laser beam along the pre-selected path.

13. The method of claim 11, further comprising triggering an emergency stop upon losing reception of the laser pilot beam by the receiving means.

14. The method of claim 1 wherein the step of generating signals corresponding to estimated motion parameters includes generating set point values for transmission to the controller; and wherein the step of operating the controller includes comparing the generated set point values with signals corresponding to the sensed actual motion parameters for varying the steering, speed control, and braking mechanisms during the simulation of the accident.

15. The method of claim 1 further comprising the steps of transmitting the generated signals corresponding to the sensed actual motion parameters at predetermined spaced locations along the pre-selected path, and storing data corresponding to the transmitted sensed actual motion parameters for comparing the sensed actual motion parameters of the simulation with the estimated motion parameters.

16. An apparatus for simulating an accident involving a motor vehicle at a location corresponding to an approach to and scene of the accident being simulated, comprising:

a selected motor vehicle having a steering mechanism, a speed control mechanism, and a braking mechanism;

a control computer for generating signals corresponding to estimated motion parameters of the motor vehicle at the approach to the simulated accident;

a plurality of sensors mounted to said selected vehicle for sensing the actual motion parameters thereof including speed, direction, and braking of said selected vehicle during operation of said selected vehicle approaching the accident being simulated;

means for guiding the selected vehicle along a pre-selected path corresponding to the approach to and the scene of the accident being simulated; and a vehicle mounted controller responsive to the guiding means and to the signals generated by the control computer and to the signals corresponding to actual sensed motion parameters from said plurality of sensors for operating the steering mechanism, the speed control mechanism and the braking mechanism of said selected vehicle during guidance of the selected vehicle along the pre-selected path.

17. The apparatus of claim 16, wherein the control computer is located outside the selected vehicle and preprogrammed to simulate the direction, braking, and speed control of the involved vehicle approaching the scene of said simulated accident.

18. The apparatus of claim 16, comprising a computer mounted on the vehicle for receiving and storing data from the plurality of sensors.

19. The apparatus of claim 18, wherein the computer mounted on the vehicle has its own power supply.

20. The apparatus of claim 16 wherein the control computer for generating signals corresponding to estimated motion parameters comprises:

means for generating a plurality of set point values for transmission to the controller; and means for changing the set point values being generated at times when the selected vehicle reaches pre-selected locations along the pre-selected path.

21. The apparatus of claim 20 wherein the vehicle mounted controller includes means for comparing the set point values in the controller with the sensed actual motion parameters for varying the operation of the steering, speed control, and braking mechanism at selected locations along the pre-selected path.

22. The apparatus of claim 16 wherein the means for guiding the selected vehicle along the pre-selected path includes a conductive cable mounted along and extending in conformance to the direction of the pre-selected path approaching the scene of the simulated accident.

23. The apparatus of claim 22 further including a plurality trigger marks spaced along the conductive cable for the purpose of determining corresponding positions of the selected vehicle approaching the scene of the simulated accident.

24. The apparatus of claim 16 wherein the means for guiding the selected vehicle along the pre-selected path includes a laser beam directed at the selected vehicle; and receivers mounted on said selected vehicle for sensing the relative locations of the laser beam and the selected vehicle.

25. The apparatus of claim 24, wherein the laser-beam receivers comprise a plurality of photocells mounted on the selected vehicle.

26. The apparatus of claim 24 wherein the vehicle mounted controller is connected to the laser-beam receivers.

* * * * *

UNITED STATES PATENT AND TRADEMARK OFFICE

CERTIFICATE OF CORRECTION

PATENT NO. : 5,338,206

DATED : August 16, 1994

INVENTOR(S) : Peter Hupfer

It is certified that error appears in the above-indentified patent and that said Letters Patent is hereby corrected as shown below:

Claim 21, column 10, line 8, change "mechanism" to --mechanisms--.

Signed and Sealed this

Sixth Day of December, 1994

Attest:

BRUCE LEHMAN

Attesting Officer

Commissioner of Patents and Trademarks